(12) United States Patent
Blaker

(10) Patent No.: US 8,253,528 B2
(45) Date of Patent: Aug. 28, 2012

(54) TRAINABLE TRANSCEIVER SYSTEM

(75) Inventor: David A. Blaker, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 197 days.

(21) Appl. No.: 10/533,919

(22) PCT Filed: Nov. 7, 2003

(86) PCT No.: PCT/US03/35641
§ 371 (c)(1),
(2), (4) Date: Apr. 21, 2006

(87) PCT Pub. No.: WO2004/043750
PCT Pub. Date: May 27, 2004

(65) Prior Publication Data
US 2006/0232376 A1    Oct. 19, 2006

Related U.S. Application Data

(60) Provisional application No. 60/424,989, filed on Nov. 8, 2002.

(51) Int. Cl.
*H04L 9/32* (2006.01)
(52) U.S. Cl. .......... 340/5.22; 340/5.7; 340/5.71
(58) Field of Classification Search .......... 340/5.22, 340/825.22, 5.61, 5.25, 5.64, 825.69, 4.11, 340/4.12, 4.13, 4.2, 4.3, 4.31, 4.32, 5.1, 5.2, 340/5.21, 5.7, 5.71, 5.72, 539, 540
See application file for complete search history.

(56) References Cited

U.S. PATENT DOCUMENTS

| | | | |
|---|---|---|---|
| 4,529,980 A * | 7/1985 | Liotine et al. | 340/825.52 |
| 4,535,333 A | 8/1985 | Twardowski | |
| 4,750,118 A | 6/1988 | Heitschel et al. | |
| 4,866,434 A | 9/1989 | Keenan | |
| 4,931,789 A * | 6/1990 | Pinnow | 340/5.64 |
| 4,988,992 A | 1/1991 | Heitschel et al. | |
| 5,379,453 A | 1/1995 | Tigwell | |
| 5,442,340 A * | 8/1995 | Dykema | 340/825.22 |
| 5,475,366 A * | 12/1995 | Van Lente et al. | 340/525 |

(Continued)

FOREIGN PATENT DOCUMENTS

EP    1 052 608 A1    11/2000

(Continued)

OTHER PUBLICATIONS

Marantec America, printed from Internet address: http://www.marantecamerica.com/html/accessories.html on Sep. 30, 2002, 14 pages.

(Continued)

*Primary Examiner* — Nabil Syed
(74) *Attorney, Agent, or Firm* — Foley & Lardner LLP

(57) ABSTRACT

A trainable transceiver system includes a trainable transceiver fixedly coupled to a vehicle interior element. The trainable transceiver is configured to receive a characteristic of an activation signal, store the characteristic of the activation signal in memory and to retransmit the characteristic of the activation signal. The trainable transceiver system also includes a portable transmitter that is configured to receive the characteristic of the activation signal from the trainable transceiver, to store the activation signal characteristic and to retransmit the stored activation signal characteristic. The characteristic of the activation signal may be transmitted from the trainable transceiver to the portable transmitter by, for example, an optical transmission or an RF transmission.

19 Claims, 3 Drawing Sheets

U.S. PATENT DOCUMENTS

| | | | |
|---|---|---|---|
| 5,479,155 A | 12/1995 | Zeinstra et al. | |
| 5,563,600 A | 10/1996 | Miyake | |
| 5,583,485 A | 12/1996 | Van Lente et al. | |
| 5,596,316 A | 1/1997 | Honeck | |
| 5,614,885 A | 3/1997 | Van Lente et al. | |
| 5,614,891 A | 3/1997 | Zeinstra et al. | |
| 5,614,906 A | 3/1997 | Hayes et al. | |
| 5,619,190 A | 4/1997 | Duckworth et al. | |
| 5,627,529 A | 5/1997 | Duckworth et al. | |
| 5,646,701 A | 7/1997 | Duckworth et al. | |
| 5,661,651 A | 8/1997 | Geschke et al. | |
| 5,661,804 A | 8/1997 | Dykema et al. | |
| 5,680,134 A | 10/1997 | Tsui | |
| 5,686,903 A | 11/1997 | Duckworth et al. | |
| 5,699,054 A | 12/1997 | Duckworth | |
| 5,699,055 A | 12/1997 | Dykema et al. | |
| 5,708,415 A | 1/1998 | Van Lente et al. | |
| 5,758,300 A | 5/1998 | Abe | |
| 5,774,064 A | 6/1998 | Lambropoulos et al. | |
| 5,790,948 A | 8/1998 | Eisfeld et al. | |
| 5,793,300 A | 8/1998 | Suman et al. | |
| 5,810,420 A | 9/1998 | Welling | |
| 5,841,390 A | 11/1998 | Tsui | |
| 5,844,473 A | 12/1998 | Kaman | |
| 5,854,593 A | 12/1998 | Dykema et al. | |
| 5,903,226 A | 5/1999 | Suman et al. | |
| 5,926,087 A | 7/1999 | Busch et al. | |
| 5,990,828 A | 11/1999 | King | |
| 5,995,898 A | 11/1999 | Tuttle | |
| 6,005,508 A | 12/1999 | Tsui | |
| 6,008,735 A | 12/1999 | Chiloyan et al. | |
| 6,020,829 A | 2/2000 | Hörmann | |
| 6,021,319 A | 2/2000 | Tigwell | |
| 6,023,241 A | 2/2000 | Clapper | |
| 6,055,468 A | 4/2000 | Kaman et al. | |
| 6,072,404 A | 6/2000 | Nolan et al. | |
| 6,078,271 A | 6/2000 | Roddy et al. | |
| 6,091,330 A | 7/2000 | Swan et al. | |
| 6,091,343 A | 7/2000 | Dykema et al. | |
| 6,127,922 A | 10/2000 | Roddy et al. | |
| 6,127,961 A | 10/2000 | Stacy et al. | |
| 6,131,019 A | 10/2000 | King | |
| 6,137,421 A | 10/2000 | Dykema | |
| 6,144,114 A | 11/2000 | Chutorash | |
| 6,154,148 A | 11/2000 | Fluharty et al. | |
| 6,160,319 A | 12/2000 | Marougi et al. | |
| 6,181,255 B1 | 1/2001 | Crimmins et al. | |
| 6,188,889 B1 | 2/2001 | Tsai | |
| 6,191,701 B1 | 2/2001 | Bruwer | |
| 6,249,673 B1 | 6/2001 | Tsui | |
| 6,265,987 B1 | 7/2001 | Wang et al. | |
| 6,271,765 B1 | 8/2001 | King et al. | |
| 6,271,815 B1* | 8/2001 | Yang et al. | 345/82 |
| 6,275,379 B1 | 8/2001 | Quinno et al. | |
| 6,308,083 B2 | 10/2001 | King | |
| 6,333,698 B1 | 12/2001 | Roddy | |
| 6,337,173 B2 | 1/2002 | Jen et al. | |
| 6,377,173 B1 | 4/2002 | Desai | |
| 6,396,408 B2 | 5/2002 | Drummond et al. | |
| 6,426,706 B1 | 7/2002 | King | |
| 6,472,885 B1 | 10/2002 | Green et al. | |
| 6,486,795 B1 | 11/2002 | Sobel et al. | |
| 6,512,461 B1 | 1/2003 | Benzie et al. | |
| 6,525,645 B2 | 2/2003 | King et al. | |
| 6,556,681 B2 | 4/2003 | King | |
| 6,556,813 B2 | 4/2003 | Tsui | |
| 6,559,775 B1 | 5/2003 | King | |
| 6,593,856 B1 | 7/2003 | Madau | |
| 6,703,941 B1 | 3/2004 | Blaker | |
| 6,724,339 B2 | 4/2004 | Conway et al. | |
| 6,747,568 B1 | 6/2004 | Teskey | |
| 6,822,603 B1 | 11/2004 | Crimmins et al. | |
| 7,050,794 B2 | 5/2006 | Chuey et al. | |
| 7,254,182 B2 | 8/2007 | Tsui | |
| 2001/0007086 A1 | 7/2001 | Rogers et al. | |
| 2001/0035811 A1* | 11/2001 | Dewan | 340/5.25 |
| 2002/0034303 A1 | 3/2002 | Farris et al. | |
| 2002/0113686 A1* | 8/2002 | Shannon Carravallah | 340/5.61 |
| 2002/0140569 A1 | 10/2002 | van Ee et al. | |
| 2002/0163440 A1 | 11/2002 | Tsui | |
| 2002/0191794 A1 | 12/2002 | Farris et al. | |
| 2003/0016139 A1 | 1/2003 | Teich | |
| 2003/0033540 A1 | 2/2003 | Fitzgibbon | |
| 2003/0112121 A1 | 6/2003 | Wilson | |
| 2003/0118187 A1 | 6/2003 | Fitzgibbon | |
| 2003/0153306 A1 | 8/2003 | Study et al. | |
| 2003/0197595 A1 | 10/2003 | Olson et al. | |
| 2003/0216139 A1 | 11/2003 | Olson et al. | |
| 2004/0017292 A1 | 1/2004 | Reese et al. | |
| 2004/0066277 A1* | 4/2004 | Murray et al. | 340/5.54 |
| 2004/0100391 A1 | 5/2004 | Guthrie | |
| 2005/0024184 A1 | 2/2005 | Chuey | |
| 2005/0024185 A1 | 2/2005 | Chuey | |
| 2005/0024229 A1 | 2/2005 | Chuey | |
| 2005/0024230 A1 | 2/2005 | Chuey | |
| 2005/0024254 A1 | 2/2005 | Chuey | |
| 2005/0024255 A1 | 2/2005 | Chuey | |
| 2005/0026601 A1 | 2/2005 | Chuey | |
| 2005/0026602 A1 | 2/2005 | Chuey et al. | |
| 2005/0026605 A1 | 2/2005 | Guthrie et al. | |
| 2005/0046545 A1 | 3/2005 | Skekloff et al. | |

FOREIGN PATENT DOCUMENTS

| | | |
|---|---|---|
| EP | 1 129 441 B1 | 5/2003 |
| FR | 2792444 A1 | 10/2000 |
| FR | 2819358 A1 | 7/2002 |
| GB | 2 325 552 A | 11/1998 |
| WO | WO 99/63308 A1 | 12/1999 |
| WO | WO 99/64274 A1 | 12/1999 |
| WO | WO 00/12850 A1 | 3/2000 |
| WO | WO 00/70577 A1 | 11/2000 |
| WO | WO 02/080129 A2 | 10/2002 |
| WO | WO 2004/034352 A1 | 4/2004 |
| WO | WO 2004/036526 A2 | 4/2004 |
| WO | WO 2004/066514 A1 | 8/2004 |
| WO | WO 2004/077729 A2 | 9/2004 |
| WO | WO 2004/104966 A2 | 12/2004 |
| WO | WO 2005/002080 A1 | 1/2005 |

OTHER PUBLICATIONS

International Search Report for PCT/US 03/35641 mailed Mar. 6, 2004; 3 pgs.
Advisory Action for U.S. Appl. No. 10/546,137, dated Nov. 16, 2009.
Applicant's response to Final Office Action for U.S. Appl. No. 10/546,137, submitted Dec. 22, 2009.
Applicant's response to Final Office Action for U.S. Appl. No. 10/546,137, submitted Jan. 3, 2011.
Applicant's response to Final Office Action for U.S. Appl. No. 10/546,137, submitted Oct. 21, 2009.
Applicant's response to non-final Office Action for U.S. Appl. No. 10/531,108, submitted Dec. 31, 2009.
Applicant's response to non-final Office Action for U.S. Appl. No. 10/531,108, submitted Jun. 21, 2010.
Applicant's response to non-final Office Action for U.S. Appl. No. 10/546,137, submitted Aug. 11, 2008.
Applicant's response to non-final Office Action for U.S. Appl. No. 10/546,137, submitted Jun. 18, 2010.
Applicant's response to non-final Office Action for U.S. Appl. No. 10/546,137, submitted May 8, 2009.
Letter and Claim Charts from Brooks Kushman P.C. to Mr. Karl Reichenberger mailed Mar. 3, 2011, 9 pages.
Office Action for U.S. Appl. No. 10/531,108, mailed May 17, 2011, 7 pages.
Office Action for U.S. Appl. No. 10/546,137, dated Mar. 11, 2011.
International Search Report for International Application No. PCT/US2004/005257, mailed Jul. 9, 2004, 3 pages.
International Search Report for International Application No. PCT/US2004/015886, mailed Oct. 12, 2004, 3 pages.
IP Receiver for High Data Rate PCM at 455 kHz, Visay TSOP7000, Document No. 82147, Rev. 4, Mar. 29, 2001, 7 pages.
Marantec America Accessories Listing, Sep. 30, 2002, 3 pages.
Marantec America Openers With a Difference Listing, Sep. 30, 2002, 2 pages.

Notice of Allowance for U.S. Appl. No. 10/531,108, dated Sep. 7, 2010, 4 pages.
Office Action for U.S. Appl. No. 10/531,108, dated Aug. 31, 2009, 7 pages.
Office Action for U.S. Appl. No. 10/531,108, mailed Mar. 19, 2010, 8 pages.
Office Action for U.S. Appl. No. 10/546,137, dated Dec. 8, 2008, 10 pages.
Office Action for U.S. Appl. No. 10/546,137, dated Feb. 18, 2010, 4 pages.
Office Action for U.S. Appl. No. 10/546,137, dated Jul. 21, 2009, 11 pages.
Office Action for U.S. Appl. No. 10/546,137, dated Mar. 11, 2008, 9 pages.
Office Action for U.S. Appl. No. 10/546,137, dated Sep. 1, 2010, 9 pages.
Photo Modules for PCM Remote Control Systems, Vishay, TSPO22, Document No. 82095, Rev. 4. Mar. 30, 2001, 7 pages.
Skylink Garage Door/Gate Remote Control, Model 39 User's Instructions, Steps for Programming the Transmitter, 2 pages.
Written Opinion for International Application No. PCT/US2004/015886, mailed Dec. 8, 2004, 6 pages.
Amendment and Reply for U.S. Appl. No. 10/546,137, mail date Jun. 13, 2011, 15 pages.
Advisory Action for U.S. Appl. No. 10/546,137, mail date Jul. 12, 2011, 3 pages
Office Action for U.S. Appl. No. 10/546,137, mail date Oct. 4, 2011, 11 pages.
Request for Continued Examination for U.S. Appl. No. 10/531,108, mail date Mar. 4, 2011, 3 pages.
Decision Granting Petition to Withdraw for U.S. Appl. No. 10/531,108, mail date Mar. 7, 2011, 1 page.
Office Action for U.S. Appl. No. 12/898,592, mail date Jun. 13, 2011, 7 pages.

* cited by examiner

TRAINABLE TRANSCEIVER SYSTEM

CROSS REFERENCE TO RELATED PATENT APPLICATION

This application claims the benefit of U.S. Provisional Application No. 60/424,989, filed Nov. 8, 2002.

BACKGROUND

In the field of wireless control of home and office electronic systems, technological advances have been developed to improve convenience, security, and functionality for the user. One example is a trainable transceiver for use with various home and office electronic systems, such as security gates, garage door openers, lights, and security systems. A user trains the trainable transceiver by, for example, transmitting an activation signal from a remote controller (e.g., an original transmitter) in the vicinity of the trainable transceiver. The trainable transceiver learns the carrier frequency and control data of the signal and stores this code for later retransmission. In this manner, the trainable transceiver can be conveniently mounted within a vehicle interior element (e.g., visor, instrument panel, overhead console, etc.) and can be configured to operate one or more home electronic systems.

Further advances are needed in the field of wireless control of home electronic systems, particularly in the case of using automotive electronics to control home electronic systems. As automotive manufacturers are adding increased electronic systems to the vehicle to improve convenience, comfort, and productivity, simplifying the interface and control of these electronic systems is also becoming increasingly important.

One limitation on the usefulness of a trainable transceiver is that it is fixedly coupled to a vehicle interior element, which limits the uses that the trainable transceiver can provide. Although trainable key fobs have been proposed, such key fobs typically require additional circuitry which adds to cost, consumes space and increases power consumption. Accordingly, what is needed is a smaller and more portable transmitter, such as a key fob, which can be trainable. Further, what is needed is a low-cost portable transmitter that improves the convenience and functionality of a trainable transceiver system. Further still, what is needed is a system and method of training a portable trainable transmitter.

There is also a need for a trainable transceiver system that uses low-cost components such as optical components. Optical transmissions can be less susceptible to noise and may provide more data in a given time period than other transmissions. Further still, there is a need for a trainable transceiver system which efficiently utilizes existing optical components for additional functions.

The teachings hereinbelow extend to those embodiments which fall within the scope of the appended claims, regardless of whether they accomplish one or more of the above-mentioned needs.

SUMMARY

According to an exemplary embodiment, a trainable transceiver system comprises a trainable transceiver and a portable transmitter. The trainable transceiver is fixedly coupled to a vehicle interior element. The trainable transceiver is configured to receive a characteristic of an activation signal, to store the activation signal characteristic in a memory, and to retransmit the activation signal characteristic via an optical transmission. The portable transmitter is configured to receive the characteristic of the activation signal from the trainable transceiver via the optical transmission, to store the activation signal characteristic, and to retransmit the stored activation signal characteristic. The characteristic can comprise control data configured to actuate a remote device. The control data can be configured to actuate a garage door opener. The control data can comprise a cryptographically-encoded control data.

The trainable transceiver can further comprise an optical transmitter configured to transmit the characteristic of the activation signal via an optical signal or a light signal. The portable transmitter can comprise an optical receiver configured to receive the light signal. The optical transmitter can be a light-emitting diode.

The portable transmitter can comprise a housing configured as a key fob. The trainable transceiver can be configured to store the frequency and control data of the activation signal. The portable transmitter can be configured to receive the frequency and control data characteristics retransmitted by the trainable transceiver. The trainable transceiver can further be configured to receive remote keyless entry data from a remote keyless entry transmitter, to store the remote keyless entry data, and to retransmit the remote keyless entry data to the portable transmitter. The remote keyless entry transmitter can comprise a housing configured as a key fob. The trainable transceiver can be configured to wirelessly receive an activation signal and to determine the characteristic to be stored based on the activation signal.

In accordance with another embodiment, the trainable transceiver may be configured to retransmit the characteristic of the activation signal via an RF transmission and the portable transmitter is configured to receive the characteristic of the activation signal from the trainable transceiver via the RF signal. The portable transmitter can comprise a broadband radio frequency receiver circuit configured to receive the retransmitted characteristic of the activation signal on any of a plurality of frequencies. Alternatively, the portable transmitter can comprise a fixed radio frequency receiver circuit configured to receive the retransmitted characteristic of the activation signal on any of a plurality of frequencies.

According to another exemplary embodiment, a trainable transceiver comprises a housing, a control circuit, and an optical transmitter. The housing is fixedly coupled to a vehicle interior element. The control circuit is coupled to the housing and is configured to receive a characteristic of an activation signal and to store the characteristic in a memory. The optical transmitter is configured to transmit the characteristic via an optical signal. The trainable transceiver can further comprise a receiver circuit configured to wirelessly receive the characteristic of the activation signal. The trainable transceiver can further comprise an operator input device coupled to the control circuit, wherein the control circuit is configured to receive the characteristic of the activation signal from the operator input device.

According to another exemplary embodiment, a trainable key fob comprises a housing, an optical receiver, a control circuit, and a wireless transmitter. The housing is configured as a key fob. The optical receiver is configured to receive an optical signal comprising a characteristic of a wireless activation signal. The control circuit is configured to store the characteristic in a memory. The wireless transmitter is configured to retransmit the stored activation signal characteristic. The control circuit can be configured to receive characteristics of the wireless activation signal comprising the frequency and control data of the activation signal. According to an alternative embodiment, components for a wired connection can replace the optical components.

According to yet another exemplary embodiment, a trainable key fob comprises a housing configured as a keyfob, an RF receiver configured to receive an RF signal comprising a characteristic of a wireless activation signal, a control circuit configured to store the characteristic in a memory and a wireless transmitter configured to retransmit the stored activation signal characteristic. The RF receiver may be a broadband receiver or a narrowband receiver.

According to another exemplary embodiment, a trainable transceiver comprises a housing, a control circuit and an RF transceiver. The housing is fixedly coupled to a vehicle interior element. The control circuit is coupled to the housing and is configured to receive a characteristic of an activation signal and to store the characteristic in a memory. The RF transceiver is configured to learn the characteristics of the activation signal and to transmit data representing the characteristic via an RF signal.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF EXEMPLARY EMBODIMENTS

Figure 1:
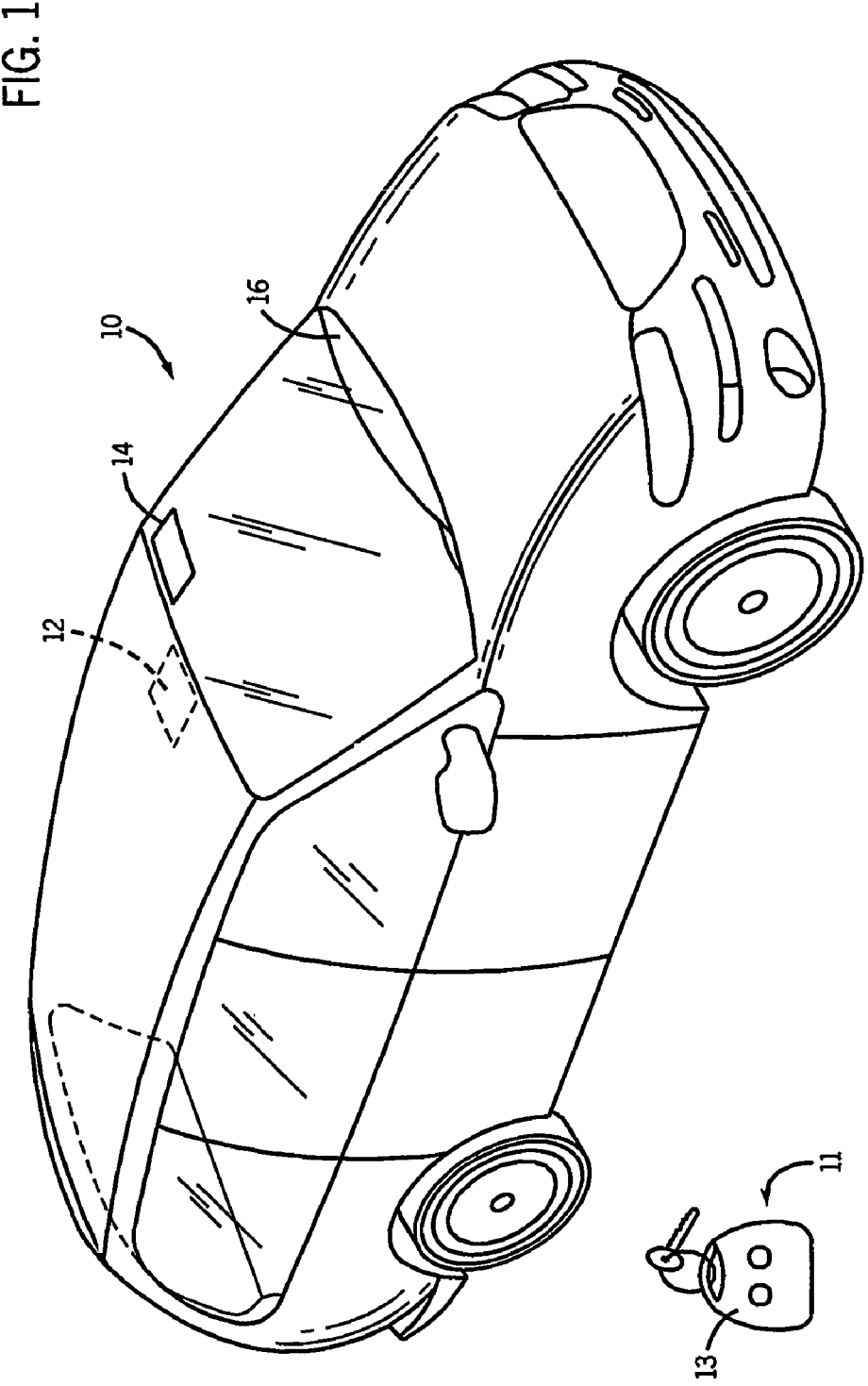
FIG. 1 is a perspective view of a vehicle having a trainable transceiver system, according to an exemplary embodiment.

Referring first to FIG. 1, a vehicle 10, which may be an automobile, truck, sport utility vehicle (SUV), mini-van, or other vehicle, includes a trainable transceiver system 11 comprising a trainable transceiver 12 and a portable transmitter 13. Trainable transceiver 12, the exemplary embodiments of which will be described hereinbelow, is illustrated fixedly coupled to or mounted to an overhead console of vehicle 10. Alternatively, one or more of the elements of trainable transceiver 12 may be mounted to other vehicle interior elements, such as, a visor 14 or instrument panel 16. Portable transmitter 13 comprises a housing configured as a key fob, keychain, or other handheld device. A key fob is a handheld device providing a keyed or wireless (e.g., via remote keyless entry) access to a vehicle.

Figure 2:
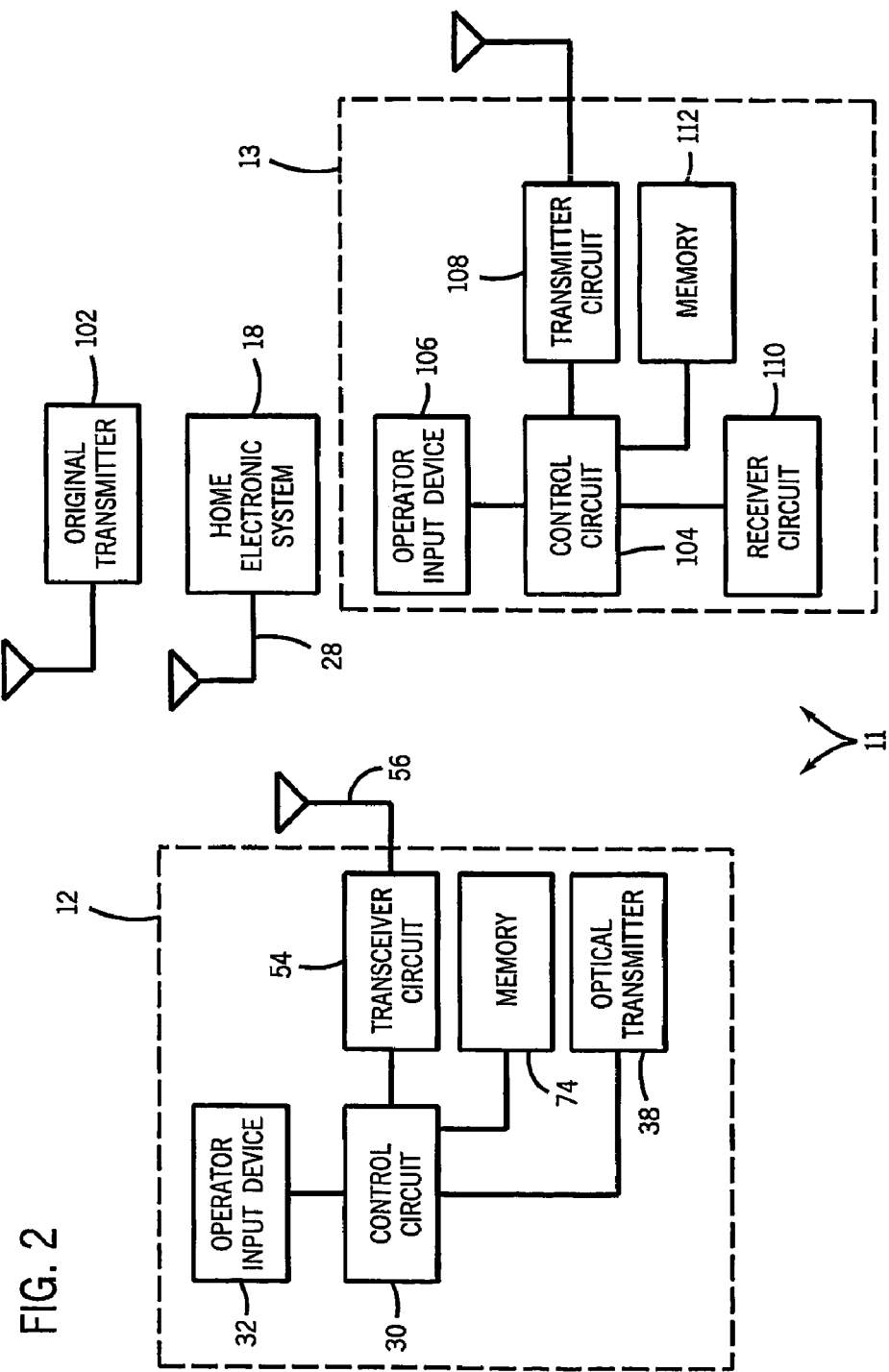
FIG. 2 is a block diagram of a trainable transceiver system and a home electronic system, according to an exemplary embodiment.

Referring now to FIG. 2, trainable transceiver system 11 is illustrated along with a home electronic system 18 which may be any of a plurality of home electronic systems, such as, a garage door opener, a security gate control system, security lights, home lighting fixtures or appliances, a home security system, etc. For example, home electronic system 18 may be a garage door opener, such as the Whisper Drive™ garage door opener, manufactured by the Chamberlain Group, Inc., Elmhurst, Ill. Home electronic system 18 may also be a lighting control system using the X10 communication standard. Home electronic system 18 includes an antenna 28 for receiving activation signals including control data which will control home electronic system 18. The activation signals are preferably in the ultra-high frequency (UHF) band of the radio frequency spectrum, but may alternatively be infrared signals or other wireless signals.

Trainable transceiver 12 includes a control circuit 30 configured to control the various portions of system 12, to store data in memory, to operate preprogrammed functionality, etc. Control circuit 30 may include various types of control circuitry, digital and/or analog, and may include a microprocessor, microcontroller, application-specific integrated circuit (ASIC), or other circuitry configured to perform various input/output, control, analysis, and other functions to be described herein. Control circuit 30 is coupled to an operator input device 32 which includes one or more push button switches 34 (see FIG. 3), but may alternatively include other user input devices, such as, switches, knobs, dials, etc., or even a voice-actuated input control circuit configured to receive voice signals from a vehicle occupant and to provide such signals to control circuit 30 for control of system 12. Trainable transceiver 12 further includes a memory 74, which may be a volatile or non-volatile memory, and may include read only memory (ROM), random access memory (RAM), flash memory, or other memory types.

Control circuit 30 is further coupled to an optical transmitter 38, which includes a light-emitting diode (LED) in this exemplary embodiment. Optical transmitter 38 may alternatively include other display elements, such as a liquid crystal display (LCD), a vacuum florescent display (VFD), etc.

Trainable transceiver 12 further includes a transceiver circuit 54 including transmit and/or receive circuitry configured to communicate via antenna 56 with home electronic system 18. Transceiver circuit 54 is configured to transmit wireless control signals having control data which will control home electronic system 18. Transceiver circuit 54 is configured, under control from control circuit 30, to generate a carrier frequency at any of a number of frequencies in the ultra-high frequency range, preferably between 260 and 470 megaHertz (MHz), wherein the control data modulated on to the carrier frequency signal may be frequency shift key (FSK) or amplitude shift key (ASK) modulated, or may use another modulation technique. The control data on the wireless control signal may be a fixed code or a rolling code or other cryptographically encoded control code suitable for use with home electronic system 18.

Figure 3:
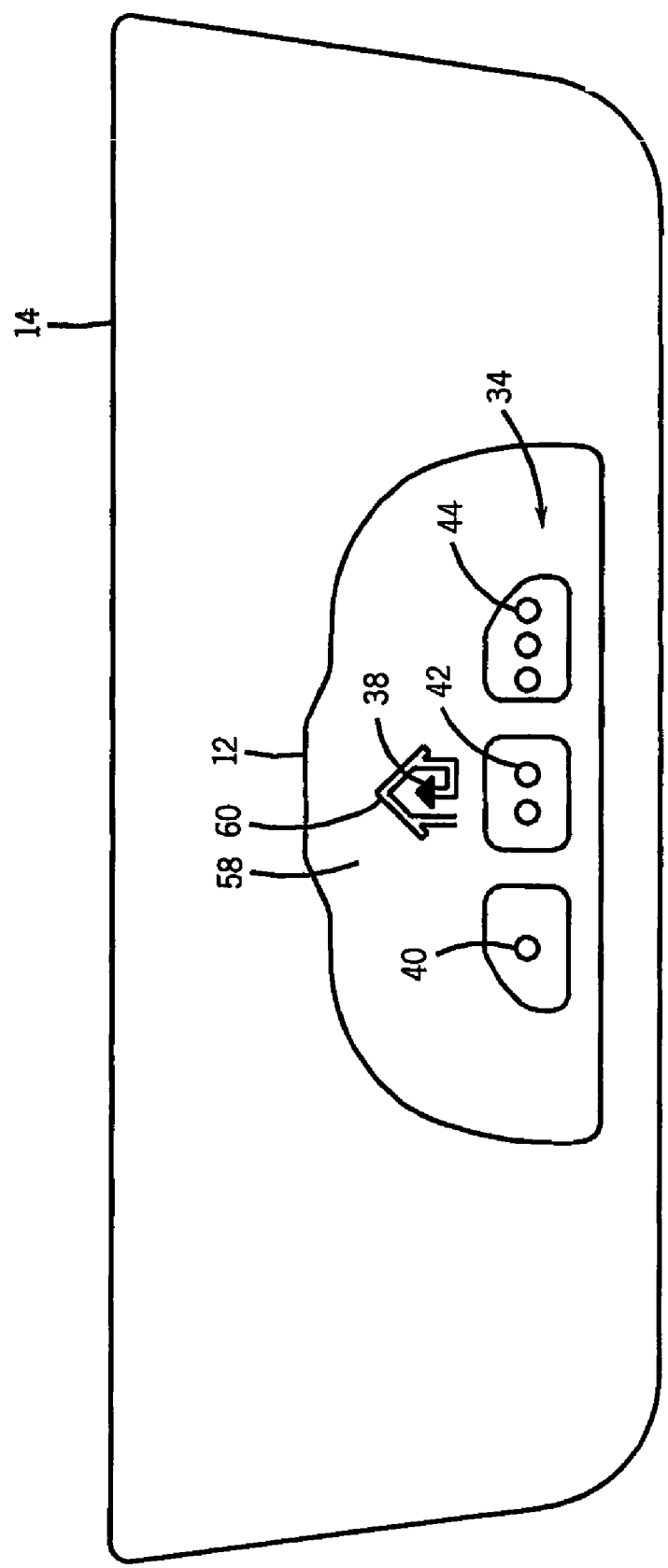
FIG. 3 is a schematic diagram of a visor having a trainable transceiver fixedly coupled thereto, according to an exemplary embodiment.

Referring now to FIG. 3, an exemplary trainable transceiver 12 is illustrated coupled to a vehicle interior element, namely a visor 14. Visor 14 is of conventional construction, employing a substantially flat, durable interior surrounded by a cushioned or leathers exterior. Trainable transceiver 12 is mounted or fixedly coupled to visor 14 by fasteners, such as, snap fasteners, barbs, screws, bosses, etc. and includes a molded plastic body 58 having three push button switches disposed therein. Each of the switches includes a respective back-lit icon 40, 42, 44. Body 58 further includes a logo 60 inscribed in or printed on body 58 and having an optical transmitter 38 disposed therewith. During training and during operation, optical transmitter 38 is selectively lit by control circuit 30 FIG. 2) to communicate certain information to the user, such as, whether a training process was successful, whether the control system 12 is transmitting a wireless control signal, etc. The embodiment shown in FIG. 3 is merely exemplary, and alternative embodiments may take a variety of shapes and sizes, and have a variety of different elements.

In operation, trainable transceiver 12 is configured to receive one or more characteristics of an activation signal sent from an original transmitter 102. Original transmitter 102 is a transmitter, typically a hand-held transmitter, which is sold with home electronic system 18 or as an after-market item, and which is configured to transmit an activation signal at a predetermined carrier frequency and having control data configured to actuate home electronic system 18. For example, original transmitter 102 can be a hand-held garage door opener transmitter configured to transmit a garage door opener signal at a frequency, such as 355 megaHertz (MHz), wherein the activation signal has control data, which can be a fixed code or a cryptographically-encoded code. Home electronic system 18 is configured to open a garage door, for example, in response to receiving the activation signal from original transmitter 102.

Trainable transceiver 18 is configured to receive one or more characteristics of the activation signal from original transmitter 102 or from another source, which characteristics can include the frequency, control data, modulation scheme, cryptographic algorithm, etc. In this embodiment, trainable transceiver is configured to learn at least one characteristic of the activation signal by receiving the activation signal, determining the frequency of the activation signal, and demodulating the control data from the activation signal. Trainable transceiver 12 can be a Homelink™ trainable transceiver, manufactured by Johnson Controls Interiors LLC, Holland, Mich., and may be constructed according to one or more embodiments disclosed in U.S. Pat. Nos. 5,614,891, 6,091,343, 5,854,593 or 5,708,415, which are herein incorporated by reference in their entirety. Alternatively, trainable transceiver 12 can be replaced with a transmitter or transceiver configured for other methods of learning or determining the characteristics of the activation signal, such as, a scanning receiver, a broadband RF detector, user input selection, a "trial and error" selection of known systems or other methods. For example, the one or more characteristics of the activation signal can be preprogrammed into memory 74 during manufacture of trainable transceiver 12 or can be input via operator input device 32 (which can include a key pad, buttons, etc.). In this manner, trainable transceiver 12 need not actually receive the activation signal in order to obtain the characteristics of the activation signal. Trainable transceiver 12 can receive the characteristics of the signal by any of these methods and store the characteristics of the activation signal in memory 74.

Referring again to FIG. 2, portable transmitter 13 is shown in block diagram form. Portable transmitter 13 comprises a control circuit 104, which can include one or more components of control circuitry described with reference to control circuit 30. Portable transmitter 13 further comprises an operator input device 106, a transmitter circuit 108, and a receiver circuit 110. The receiver circuit is configured to receive data from the trainable transceiver including one or more characteristics of the original transmitter. In this embodiment, trainable transceiver 12 is configured to transmit one or more characteristics of the activation signal to portable transmitter 13. Trainable transceiver 12 can transmit the activation signal itself (i.e., using the carrier frequency and control data of the activation signal), or trainable transceiver 12 can transmit the one or more characteristics of the activation signal using any other transmission frequency, data code, modulation scheme, or other signal characteristic. In this embodiment, trainable transceiver 12 is configured to modulate control data of the activation signal (and/or other data code characteristics) onto a light signal by controlling optical transmitter 38 to transmit the light signal. Preferably, the control code is modulated at a high enough frequency (e.g., at least 38 kHz, 40 kHz, or 455 kHz) such that the light signal appears to be steadily lit to the human eye.

Optical transmitter 38 can be a light-emitting diode, and can serve both functions of communicating above with the operator during training of trainable transceiver 12, as described herein, and/or optical transmitter 38 can be used to transfer one or more characteristics of the activation signal from original transmitter 102 to the portable transmitter 13.

Portable transmitter 13 is configured to receive the characteristics of the activation signal from trainable transceiver 12 and to store the characteristics in a memory 112 for later use. Portable transmitter 13 can retransmit the stored activation signal characteristic, preferably as the activation signal itself, having the proper frequency and control data, to home electronic system 18 to activate home electronic system 18.

According to one exemplary embodiment, trainable transceiver 12 modulates a data packet on to the light signal transmitted by optical transmitter 38 every time trainable transceiver 12 transmits an activation signal via transceiver circuit 54. Typically, this occurs in response to operator actuation of operator input device 32, but other events can trigger the transmission, such as the location of the vehicle, time of day, etc.

Portable transmitter 13 comprises a receiver circuit 110, which can be an optical receiver or photo sensor configured to receive and decode the light signal itself or under control of control circuit 104. For example, a TSOP7000 (455 kHz) or TSOP 2240, manufactured by Vishay Semiconductor GmbH, Heilbronn, Germany can be used. In this embodiment, every time a button on operator input device 106 is activated, receiver circuit 110 is configured to receive an optical signal from optical transmitter 38 at a predetermined transmission rate and modulation format. Alternatively, portable transmitter 13 is configured to default to a receive mode wherein receiver circuit 110 is configured to receive the light signal from optical transmitter 38. If receiver circuit 110 detects a signal from trainable transceiver 12, receiver circuit 110 receives the signal and control circuit 104 is configured to store the activation signal characteristic(s) in memory 112 for use the next time operator input device 106 is actuated.

Alternatively, trainable transceiver 12 and portable transmitter 13 can be configured to communicate via an electrical connection, such as a wired connection, wherein trainable transceiver 12 would further include a connection port for data (not shown and receiver circuit 110 would be replaced with a connection port for data, an ultrasonic transmission, wherein optical transmitter 38 and receiver circuit 110 are replaced with sonic or ultrasonic transducers, an inductive coupling, wherein optical transmitter 38 and receiver circuit 110 are replaced with inductive windings, a capacitive technique, wherein optical transmitter 38 and receiver circuit 110 are configured to transmit via a capacitive coupling, an LF signal, wherein the optical transmitter 38 and the receiver circuit are replaced with an LF transmitter and receiver respectively, or a radio frequency signal, wherein optical transmitter 38 is replaced with an RF transmitter and receiver circuit 110 is an RF receiver circuit. In an alternative embodiment, where a radio frequency signal is used to communicate the activation signal characteristic between the trainable transceiver 12 and the portable transceiver 13, the transceiver circuit 54 and antenna 56 may be used to transfer the activation signal characteristic(s) to the portable transmitter 13. Alternatively, receiver circuit 110 can be a broadband receiver configured to receive signals at any of a plurality of frequencies, or a fixed frequency receiver circuit. Either of the fixed frequency or broadband receiver circuits have lower costs and are simpler to construct than a tunable receiver, although a tunable receiver can also be used in some embodiments. Preferably, either optical or radio frequency methods are used, since trainable transceiver 12 is configured in commercial embodiments with the proper hardware for such communication. In another embodiment, portable transmitter 13 can be configured to receive any type of signal which conveys at least one characteristic of the activation signal of original transmitter 102.

According to one advantageous embodiment, portable transmitter 13 comprises a housing configured as a key fob.

According to a further advantageous embodiment, trainable transceiver 12 can be configured to receive remote keyless entry data from a remote keyless entry transmitter, to store the remote keyless entry data, to transfer the remote keyless entry data to the portable transmitter 13. The portable transmitter 13 may then be used to retransmit the remote keyless entry data, for example, in response to an actuation of operator input device 106. In this manner, portable transmitter 13 can be configured to transmit an activation signal to operate home electronic system 18 in response to a first operator input device actuation (e.g., a first button), and, in response to second operator input device actuation (e.g., a second button), portable transmitter 13 can be configured to transmit a remote keyless entry signal to allow an operator to gain access to vehicle 10 (FIG. 1). The remote keyless entry transmitter that the portable transmitter 13 is training to can comprise a housing configured as a key fob. Portable transmitter 13 can be configured to store a plurality of remote keyless entry signals, each of which can have a different data code, modulation format, and/or frequency, etc. In this manner, a single portable transmitter can be configured to transmit activation signals or other wireless signals to control garage door openers, home lighting, wireless door locks (vehicle or home/office), security systems, etc.

According to one exemplary embodiment, trainable transceiver 12 is fixedly coupled to a vehicle interior element. This fixed coupling provides a convenient location for a trainable transmitter in vehicle 12, and further prevents an operator from losing, misplacing, dropping, or otherwise losing control of trainable transceiver 12. The term "fixedly coupled" refers to the characteristic that trainable transceiver 12 is not removable from the vehicle interior element, though it may be moved within the vehicle interior element (for example, in a sliding configuration).

According to one exemplary embodiment, portable transmitters can comprise a housing formed as a key fob, which is typically curved and smaller than a conventional, square original transmitter.

According to one advantage, portable transmitter 13 provides portability of the characteristics of the activation signal stored by trainable transceiver 12, but is less expensive in some embodiments, such as, those embodiments wherein low-cost parts are used, such as a transmitter instead of a transceiver or a frequency-agile transceiver. In one inexpensive embodiment, receiver circuit 110 of portable transmitter 13 can be a simple radio frequency field detector, such as, a detector comprising or consisting of a coil, a diode, and a capacitor.

According to one exemplary embodiment, portable transmitter 13 clones itself from trainable transceiver 12, which means that data is transferred from trainable transceiver 12 to portable transmitter 13 sufficient to replicate the control data and frequency of an activation signal sent by original transmitter 102.

According to one exemplary embodiment, portable transmitter 13 is smaller and more portable than trainable transceiver 12.

According to alternative embodiments, the training or cloning process between trainable transceiver 12 and portable transmitter 13 can be activated in response to a manual press of operator input device 32, by establishing a physical, wired connection between trainable transceiver 12 and portable transmitter 13, or automatically, wherein trainable transceiver 12 transmits data upon activation at operator input device 32 and portable transmitter 13 maintains receiver circuit 110 in an always-on mode, wherein it is configured to receive data from optical transmitter 38 on trainable transceiver 12.

According to alternative embodiments, portable transmitter 13 can be configured to receive data that represents a characteristic of either fixed code or rolling code remote keyless entry data from the trainable transceiver 12. Rolling code systems utilize a secret encryption key and a rolling counter to encrypt the information. Control circuit 104 can be configured to operate with such rolling code systems. The encryption key can be preprogrammed into control circuit 104 or, perhaps, learned by control circuit 104 from the signals transmitted from trainable transceiver 12.

According to one exemplary embodiment, the different wireless control signals will be transmitted in the order in which they were selected during training. According to an alternative embodiment, trainable transceiver 12 can be a source device which is not trainable or not a transceiver (e.g., where the source device can be manually programmed).

While the exemplary embodiments illustrated in the FIGS. And described above are presently preferred, it should be understood that these embodiments are offered by way of example only. For example, alternative embodiments may be suitable for use in the commercial market, wherein office lights or security systems or parking garage doors are controlled. Accordingly, the present invention is not limited to a particular embodiment, but extends to various modifications that nevertheless fall within the scope of the appended claims.

I claim:

1. A trainable transceiver system for providing an activation signal characteristic to a portable transmitter, the trainable transceiver system comprising:
    a transceiver configured to receive a characteristic of an activation signal from an original transmitter for actuating a remote device;
    a light emitting diode (LED) configured to transmit the characteristic of the activation signal via an optical transmission to an optical receiver of the portable transmitter; and
    a control circuit configured to store the characteristic of the activation signal in a memory, and to cause the LED to transmit the stored characteristic of the activation signal in response to an input signal from an operator input device, wherein the control circuit is further configured to cause the transceiver to transmit the activation signal in response to the input signal from the operator input device, wherein the control circuit is further configured to light the LED in response to the input signal from the operator input device and to visually communicate information to a user of the system, wherein the control circuit is further configured to modulate the LED, while the LED is lit for visually communicating information to the user, to create a light signal having data packets for transmitting the characteristic of the activation signal to the optical receiver of the portable transmitter.

2. A system according to claim 1, wherein the characteristic comprises a data code configured to actuate the remote device.

3. A system according to claim 2, wherein the data code is configured to actuate a garage door opener.

4. A system according to claim 2, wherein the data code comprises a cryptographically encoded data code.

5. A system according to claim 1, wherein the portable transmitter comprises a housing configured as a keyfob.

6. A system according to claim 1, wherein the trainable transceiver is configured to store the frequency and data code of the activation signal, wherein the portable transmitter is configured to receive the frequency and data code of the retransmitted characteristics of the activation signal.

7. A system according to claim 1, wherein the trainable transceiver is further configured to receive remote keyless entry data from a remote keyless entry transmitter, to store the remote keyless entry data, and to retransmit the remote keyless entry data to the portable transmitter.

8. A system according to claim 7, wherein the remote keyless entry transmitter comprises a housing configured as a keyfob.

9. A system according to claim 1, wherein the trainable transceiver is configured to wirelessly receive an activation signal and to determine the characteristic to be stored based on the activation signal.

10. A trainable transceiver system, comprising:
   a trainable transceiver fixedly coupled to a vehicle interior element configured to receive a characteristic of an activation signal from an original transmitter for actuating a remote device, to store the characteristic of the activation signal in a memory, and to retransmit the characteristic of the activation signal via an optical signal sent from an LED; and
   a portable transmitter configured to receive the characteristic of the activation signal from the trainable transceiver via the optical signal, to store the activation signal characteristic, and to retransmit the stored activation signal characteristic;
   wherein the trainable transceiver is configured to light the LED in response to an input signal from an operator input device and to use a radio frequency transmitter to transmit the activation signal in response to the input signal, wherein the trainable transceiver is further configured to light the LED in response to the input signal to visually communicate information to a user of the system, and wherein the trainable transceiver is further configured to modulate the LED, while the LED is lit for visually communicating information to the user, to create a light signal having data packets for transmitting the characteristic of the activation signal to the portable transmitter.

11. A system according to claim 10, wherein the characteristic comprises a data code configured to actuate the remote device.

12. A system according to claim 11, wherein the data code is configured to actuate a garage door opener.

13. A system according to claim 11, wherein the data code comprises a cryptographically encoded data code.

14. A system according to claim 10, wherein the portable transmitter comprises a housing configured as a keyfob.

15. A system according to claim 10, wherein the trainable transceiver is configured to store the frequency and data code of the activation signal, wherein the portable transmitter is configured to receive the frequency and data code of the retransmitted characteristics of the activation signal.

16. A system according to claim 10, wherein the trainable transceiver is further configured to receive remote keyless entry data from a remote keyless entry transmitter, to store the remote keyless entry data, and to retransmit the remote keyless entry data to the portable transmitter.

17. A system according to claim 16, wherein the remote keyless entry transmitter comprises a housing configured as a keyfob.

18. A system according to claim 10, wherein the trainable transceiver is configured to wirelessly receive an activation signal and to determine the characteristic to be stored based on the activation signal.

19. A trainable transceiver, comprising:
   a housing fixedly coupled to a vehicle interior element;
   a control circuit coupled to the housing, the control circuit configured to receive a characteristic of an activation signal from an original transmitter for actuating a remote device and to store the characteristic in a memory; and
   an LED configured to transmit the characteristic via an optical signal to a portable device;
   wherein the control circuit is configured to light the LED in response to a user input signal from an operator input device to visually communicate information to a user of the system, wherein the control circuit is further configured to modulate the LED, while the LED is lit for visually communicating information to the user, to create a light signal having data packets for transmitting the characteristic of the activation signal to the portable device, wherein the control circuit is further configured to cause the transceiver to transmit the activation signal in response to the input signal from the operator input device.

* * * * *